(12) United States Patent
Bertacchini et al.

(10) Patent No.: US 12,730,214 B2
(45) Date of Patent: Sep. 8, 2026

(54) REFINING A RADAR-DETECTED TARGET VOLUME

(71) Applicant: Inxpect S.p.A., Brescia (IT)

(72) Inventors: Ugo Bertacchini, Brescia (IT); Michele Belotti Cassa, Brescia (IT); Rakefet Weidenfeld, Brescia (IT); Sagi Sheer, Brescia (IT)

(73) Assignee: Inxpect S.p.A., Brescia (IT)

( * ) Notice: Subject to any disclaimer, the term of this patent is extended or adjusted under 35 U.S.C. 154(b) by 315 days.

(21) Appl. No.: 18/223,151

(22) Filed: Jul. 18, 2023

(65) Prior Publication Data

US 2024/0027606 A1 Jan. 25, 2024

(30) Foreign Application Priority Data

Jul. 21, 2022 (EP) .................................... 22186335

(51) Int. Cl.

| | |
|---|---|
| ***G06T 7/246*** | (2017.01) |
| ***G01S 7/41*** | (2006.01) |
| ***G01S 13/72*** | (2006.01) |
| ***G01S 13/86*** | (2006.01) |

(52) U.S. Cl.

CPC ............ *G01S 13/867* (2013.01); *G01S 7/415* (2013.01); *G01S 13/726* (2013.01); *G06T 7/246* (2017.01); *G06T 2207/10028* (2013.01); *G06T 2207/30196* (2013.01)

(58) Field of Classification Search

CPC ...... G01S 13/867; G01S 7/415; G01S 13/726; G01S 13/42; G01S 13/886; G06T 7/246; G06T 2207/10028; G06T 2207/30196

See application file for complete search history.

(56) References Cited

U.S. PATENT DOCUMENTS

| | | | | |
|---|---|---|---|---|
| 10,438,371 | B2 * | 10/2019 | Xu ........................ | G06V 10/454 |
| 11,334,762 | B1 * | 5/2022 | Wrenninge ........... | G06F 18/214 |
| 2020/0217948 | A1 | 7/2020 | Wang et al. | |
| 2021/0117659 | A1 | 4/2021 | Foroozan et al. | |

OTHER PUBLICATIONS

Muqaibel et. al. Target Localization with a Single Antenna via Directional Multipath Exploitation, International Journal of Antennas and Propagation, 2015, 510720, 10 pages, 2015 (Year: 2015).*

R. Zhang and S. Cao, “Extending Reliability of mmWave Radar Tracking and Detection via Fusion With Camera,” in IEEE Access, vol. 7, pp. 137065-137079, 2019 (Year: 2019).*

Extended European search report dated Jan. 4, 2023; Application No. 22186335.0; 7 pages.

Zhang Renyuan et al: “Extending Reliability of mmWave Radar Tracking and Detection via Fusion With Camera”, IEEE Access, vol. 7, Sep. 19, 2019 (Sep. 19, 2019); 15 pages.

* cited by examiner

*Primary Examiner* — Resha Desai
*Assistant Examiner* — Bongani Jabulani Mashele
(74) *Attorney, Agent, or Firm* — RANKIN, HILL & CLARK LLP; Erik J. Overberger

(57) ABSTRACT

A radar sensor scans an environment to identify, for each target, a candidate target volume. A camera, fixed to the radar sensor, captures an image of the environment, and runs an image recognition algorithm to identify target boundaries for each target. The radar sensor determines a refined target volume, by selecting and keeping a first part of the candidate target volume located inside the target boundaries and removing a second part of the candidate target volume located outside the target boundaries.

6 Claims, 2 Drawing Sheets

REFINING A RADAR-DETECTED TARGET VOLUME

FIELD OF THE INVENTION

The present invention relates to the field of radar detection, especially for intrusion detection and workplace safety.

BACKGROUND OF THE INVENTION

Radar sensors are known to scan an environment to detect targets and their position in the environment.

In many applications, the resolution of the radar sensor is high enough for each targets to be detected not just as one point occupying one position, but in their volume, as a set of points. In more detail, each point is determined to be occupied or not by the target based on signal intensity from that point.

However, while radar sensors are usually precise in determining the distance of a target, the determination of the target position in terms of azimuth and elevation depends on the number and position of plural antenna elements of the radar sensor, and is usually affected by a lower resolution. In particular, the volume that the radar sensor attributes to the target is generally larger in azimuth and elevation compared to the real target volume.

SUMMARY OF THE INVENTION

The Applicant has tackled the problem of refining the target volume detected by a radar for a target in an environment.

This and other objects are achieved by a radar system and a method for refining a radar-detected target volume of a target in an environment, according to any of the appended claims.

After determining a candidate target volume by the radar sensor, refinement is achieved thanks to a camera fixed to the radar sensor. Each target, enclosed by target boundaries, is identified by an image recognition algorithm in an image captured by the camera. Then, a portion of the candidate target volume is kept, as it falls within the target boundaries, while another portion, outside the target boundaries, is removed.

This joins the higher precision of the camera in terms of azimuth and elevation, with the distance as identified by the radar sensors, which could not be determined that accurately by the camera.

BRIEF DESCRIPTION OF THE DRAWINGS

The present invention will now be described in more detail hereinafter with reference to the accompanying drawings, in which embodiments of the invention are shown.

DETAILED DESCRIPTION

A radar system 1 is described herein, which is capable of performing a method for refining a radar-detected target volume 110 of a target 100 in an environment 200.

Figure 1:
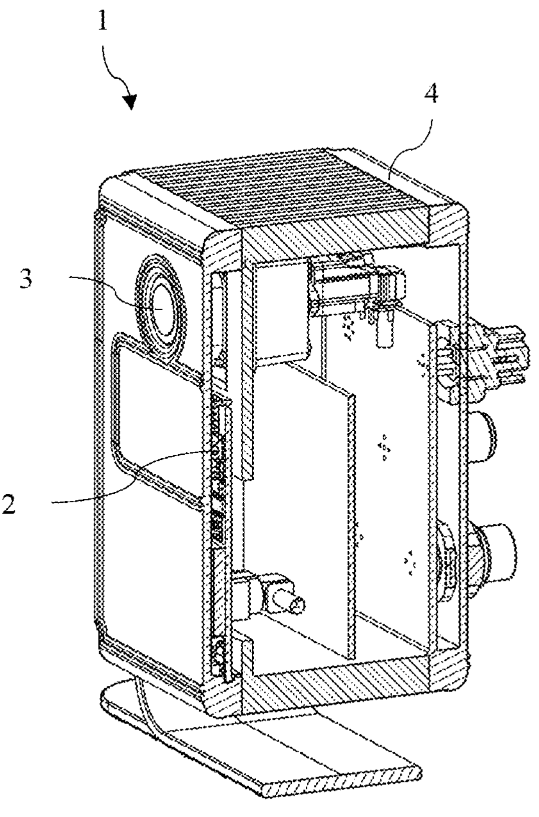
FIG. 1 is a perspective section view of a radar system according to one embodiment of the invention.

The system 1 comprises a radar sensor 2, which may be realized on a circuit board as partially visible in FIG. 1. The method comprises cyclically scanning the environment 200 with a radar signal by the radar sensor 2 to detect targets 100. As already known, a candidate target volume 110 is identified for each target 100, based on the radar signal.

In more detail, the radar sensor 2 is configured to determine a signal intensity for a plurality of domain points in a field of view of the radar sensor 2. Each domain point has its individual discrete coordinates. For this invention, radar sensors 2 with three-dimensional resolution are considered, namely for each domain point to have three coordinates like range, that is distance of the domain point from the radar sensor 2, as well as azimuth and elevation angles.

Each domain point is determined to be a candidate target point 111, that is a point allegedly occupied by the target 100, if its signal intensity is above a certain fixed or variable threshold, or an empty point if its signal is below the threshold.

Thus, the candidate target volume 110 is formed as a cloud of candidate target points 111, adjacent to each other.

The radar system 1 comprises a camera 3 fixed to the radar sensor 2. Preferably, the camera 3 is a calibrated camera, in particular having a known zoom level.

Preferably, the camera 3 and the radar sensor 2 are positioned with substantially the same position and orientation. This may be achieved by housing the camera 3 and the radar sensor 2 in a common enclosure 4, as visible in FIG. 1.

The position and orientation are considered substantially the same if the camera 3 and radar sensor 2 are close enough and oriented toward a common field of view, more in particular if the range, azimuth and elevation of the domain points are substantially the same when referred to the camera 3 as when referred to the radar sensor 2, at least for a major portion of the field of view.

The camera 3 is configured to cyclically capture an image 300 of its field of view in the environment 200. Then, the camera 3 cyclically runs an image recognition algorithm on the image 300, to identify targets 100 in the image 300.

Figure 2:
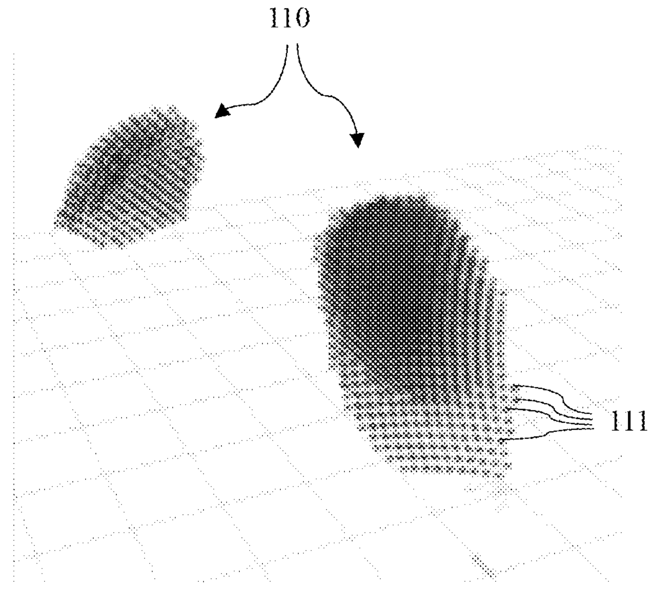
FIG. 2 is a view of an environment with targets as perceived by a radar sensor of the radar system.
Figure 3:
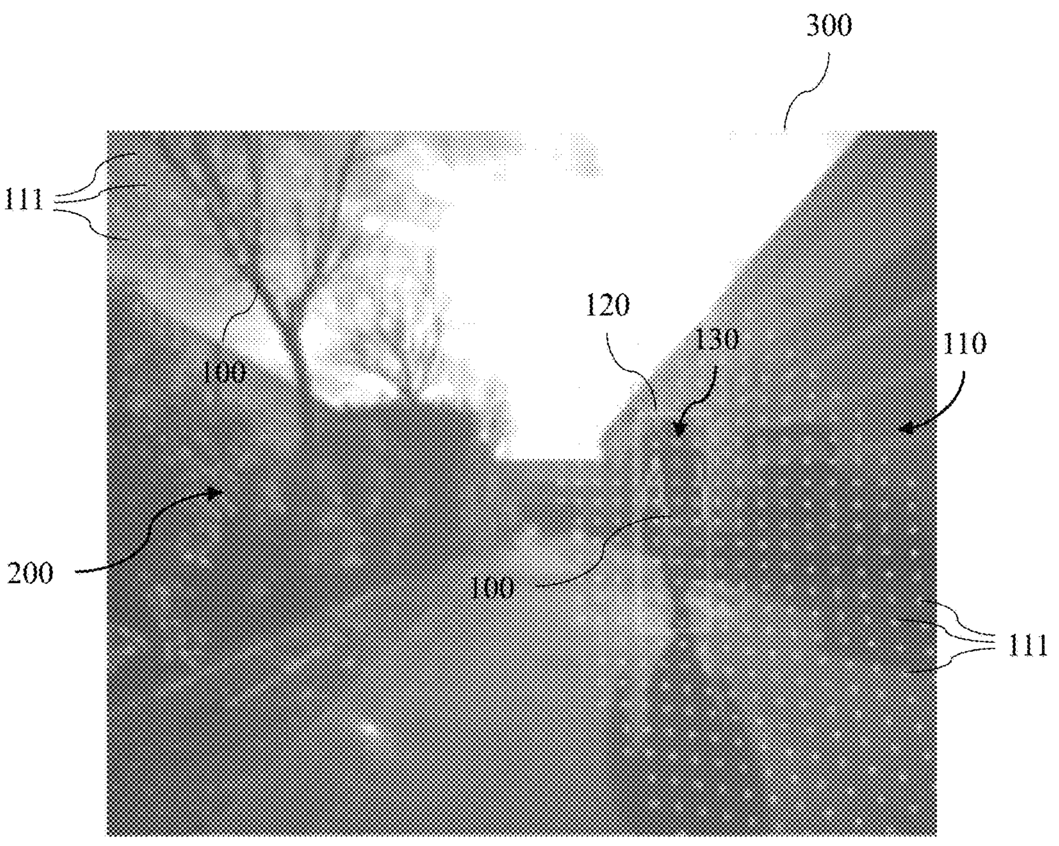
FIG. 3 is a view of an image of the environment with targets, as captured by a camera of the radar system, having projected candidate volumes of the targets as detected by the radar sensor.
Figure 4:
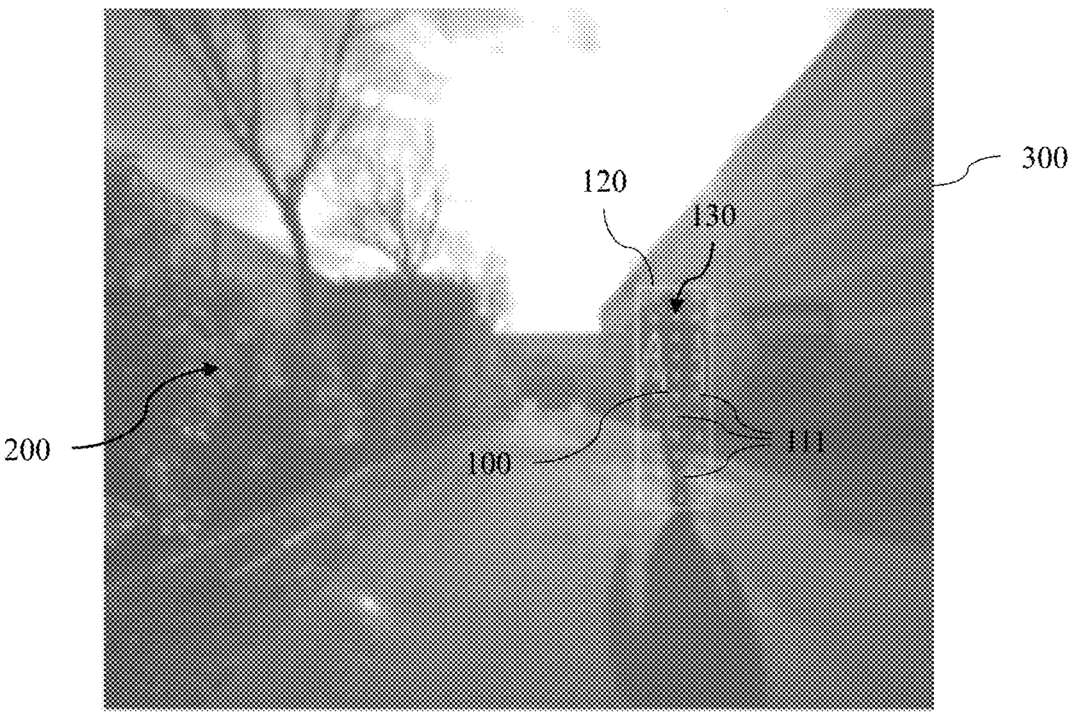
FIG. 4 is a view of the image of FIG. 3, after refining the candidate target volume.

It is worthwhile noting that the radar sensor 2, in preferred embodiments, is configured to detect moving targets 100, and not to detect still targets 100. In other embodiments still targets 100 may be detected too, but in both cases targets 100 are detected based on radar signal intensity, substantially regardless of their shape, as can be noted also from FIG. 2. Instead, an image recognition algorithm heavily relies on the appearance of the target 100 in order to identify it in an image 300.

Therefore, targets 100 may exist which are detected by only one of the radar sensor 2 and the camera 3. The image recognition algorithm is preferably configured to identify at least targets 100 belonging to a predetermined list of target classes, depending on the intended use of the radar system 1. Preferably, the list includes at least a class of human targets.

In some embodiments, the list of classes is stored in the camera 3, and the camera 3 is capable of attributing to each target 100 a class selected from the list, based on reference details of each target 100 or on other artificial intelligence dynamics that are not readily understandable by a human. In other embodiments, the image recognition algorithm may be just capable of identifying certain targets 100, without a class list being stored.

When a target 100 is identified in the captured image 300, target boundaries 120 are also identified in a known manner, which enclose a target shape of the target 100 in the image 300.

In an aspect of the invention, the radar sensor 2 is configured to receive the target boundaries 120 from the camera 3, and to cyclically determine a refined target volume 130 based on the target boundaries 120.

In particular, a first part of the candidate target volume 110, that is located inside the target boundaries 120, is selected and kept as the refined target volume 130. Instead, a second part of the candidate target volume 110, that is located outside the target boundaries 120, is removed and not included in the refined target volume 130. Thus, the refined target volume 130 is that part of the candidate target volume 110 falling inside the target boundaries 120 as determined by the camera 3.

Similarly to the candidate target volume 110, also the refined target volume 130 is formed as a cloud of target points, adjacent to each other. Namely, for each candidate target point 111, its individual coordinates are determined to be inside or outside the target boundaries 120. If the coordinates are inside, the candidate target point 111 is selected as a confirmed target point, belonging to the refined target volume 130. If the coordinates are outside, the candidate target point 111 is not confirmed and discarded.

It is to be noted that, while each candidate target point 111 as detected by the radar sensor 2 has three coordinates, the target boundaries 120 are generated based on a two-dimensional image. Nevertheless, target boundaries 120 can still be used as the criterion for selecting or discarding the candidate target points 111.

In the preferred embodiments, as described above, the azimuth and elevation angles of each candidate target point 111 is substantially the same when referred to the radar sensor 2 and to the camera 3. Moreover, it is known to the skilled person that each point of a two-dimensional image 300 can be easily attributed an azimuth and an elevation angle relative to the camera 3, especially when the camera 3 is calibrated, such that its known zoom level can be used to convert pixel positions in the image to real world azimuth and elevation angles. Thus, the target boundaries 120 are formed as closed lines of boundary points, each represented in terms of azimuth and elevation coordinates.

Therefore, in preferred embodiments. among the individual coordinates of each candidate target point 111, only the azimuth and elevation angles are compared to the target boundaries 120, while the range of the candidate target point 111 is not involved in the comparison.

This may substantially amount to a process where the candidate target volume 110 is projected in the image 300, either ideally, or concretely by displaying both on the same screen. In this projection, each row of candidate target points 111 having the same azimuth and elevation, but different ranges, is represented as a single point or as a group of coincident points. Then, all the candidate target points 111 belonging to rows that fall outside the target boundaries 120 are discarded. It is thus clear that the candidate target volume 110 is refined in terms of azimuth and elevation, but not in term of range.

Other working embodiments may be conceived by the skilled person, possibly even more precise but more computationally burdensome, where it is not assumed that azimuth and elevation are the same when referred to the camera 3 and to the radar sensor 2. For these embodiments, it is not even required that the camera 3 and the radar sensor 2 are neither so close to each other nor oriented in so close directions. These embodiments generally require either the coordinates of the candidate target points 111 to be translated in a reference system compatible with the target boundaries 120, or the coordinates of the target boundaries 120 to be translated in a reference system compatible with the candidate target points 111. Then, the comparison can be performed as described above.

After the refined target volume 130 has been determined, subsequent processing may be substantially as already known to the skilled person, based on the intended use of the radar system 1.

In most applications, the radar sensor 2 has stored therein a three-dimensional region of interest of the environment 200, delimited by region boundaries, generally in the form of lines and surfaces. The radar sensor 2 is thus configured to cyclically determine if the target 100 is in the region of interest, by comparing with the region of interest the refined target volume 130 only, and not the candidate target volume 110. In particular, it is assessed if at least a portion of the refined target volume 130 is located inside the region of interest.

Moreover, as the image recognition algorithm may be optionally configured to determine target classes as described above, targets 100 of one or more classes, preferably including a class of human targets, are selected and kept, while targets 100 of other classes may be ignored. For example, in the figures a tree has been detected as a target 100 by the radar sensor 2, but then it was ignored, either because its category was not allowed, or because the camera 3 did not recognize it as a target 100.

Detection of targets 100 which fulfilled the position and/or class requirements as described above may trigger alarms or control signals as known to the skilled person.

The invention claimed is:

1. A radar system, comprising:

a radar sensor, configured to scan an environment with a radar signal and to identify, for each target, a candidate target volume based on the radar signal, the candidate target volume being formed as a cloud of target points, a camera fixed to the radar sensor, configured to capture an image of the environment, and to run an image recognition algorithm to identify, for each target, target boundaries enclosing a target shape in the image, wherein the radar sensor is configured to receive the target boundaries from the camera and to determine a refined target volume, the refined target volume being formed as a cloud of target points, wherein each target point of the candidate target volume and the refined target volume has individual coordinates, and wherein the refined target volume is construed by determining if the individual coordinates of each target point of the candidate target volume are inside or outside the target boundaries, selecting and keeping all the target points of the candidate target volume inside the target boundaries, as a first part of the candidate target volume located inside the target boundaries, and removing all the target points of the candidate target volume outside the target boundaries, as a second part of the candidate target volume located outside the target boundaries, wherein the radar sensor is configured to determine if the target is in a region of interest of the environment, by comparing with the region of interest the refined target volume.

2. The system of claim 1, wherein the camera and the radar sensor are positioned with substantially the same position and orientation.

3. The system of claim 1, wherein:

the individual coordinates of each target point comprise a distance from the radar sensor, an azimuth angle and an elevation angle, and determining if the individual coordinates of each target point are inside or outside the target boundaries comprises, for each target point, comparing with the target boundaries the azimuth and elevation angles only, and not the distance from the radar sensor.

4. The system of claim 1, comprising, before determining the refined target volume, projecting in the image the candidate target volume.

5. The system of claim 1, wherein the image recognition algorithm is configured to:

determine a class of each target, selected from a stored list of classes, and select and keep targets of at least one class, preferably including a class of human targets, and discard targets of any remaining class.

6. A method for refining a radar-detected target volume of a target in an environment, comprising:

scanning the environment with a radar signal by a radar sensor and identifying, for each target, a candidate target volume based on the radar signal, the candidate target volume being formed as a cloud of target points, capture an image of the environment by a camera fixed to the radar sensor, running an image recognition algorithm on the image to identify, for each target, target boundaries enclosing a target shape in the image, determining a refined target volume as a cloud of target points, by determining if individual coordinates of each target point of the candidate target volume are inside or outside the target boundaries, selecting and keeping all the target points of the candidate target volume inside the target boundaries, as a first part of the candidate target volume located inside the target boundaries, and removing all the target points of the candidate target volume outside the target boundaries, as a second part of the candidate target volume located outside the target boundaries.

* * * * *